(12) United States Patent
Wiegand et al.

(10) Patent No.: US 8,942,922 B2
(45) Date of Patent: Jan. 27, 2015

(54) NAVIGATION LOCATION MARK BY CELL PHONE

(75) Inventors: Michael Wiegand, Birmingham, MI (US); Justin McBride, West Bloomfield, MI (US); Toshihiro Wakamatsu, West Bloomfield, MI (US); Hiroto Uesaka, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 1300 days.

(21) Appl. No.: 12/413,826

(22) Filed: Mar. 30, 2009

(65) Prior Publication Data

US 2010/0250130 A1 Sep. 30, 2010

(51) Int. Cl.
G01C 21/36 (2006.01)

(52) U.S. Cl.
CPC ........ *G01C 21/3679* (2013.01); *G01C 21/3688* (2013.01)
USPC ....................................................... 701/468

(58) Field of Classification Search
USPC .......................................... 701/469, 213, 468
See application file for complete search history.

(56) References Cited

U.S. PATENT DOCUMENTS

| | | | | |
|---|---|---|---|---|
| 6,124,826 A * | 9/2000 | Garthwaite et al. | ...... | 342/357.46 |
| 6,633,809 B1 * | 10/2003 | Aizono et al. | ................ | 701/200 |
| 6,693,586 B1 * | 2/2004 | Walters et al. | ................ | 342/357.4 |
| 6,801,855 B1 * | 10/2004 | Walters et al. | ................ | 701/216 |
| 6,816,782 B1 * | 11/2004 | Walters et al. | ................ | 701/209 |
| 7,877,204 B2 * | 1/2011 | Sprigg | ................ | 701/209 |
| 7,925,320 B2 * | 4/2011 | Pemble et al. | ................ | 455/575.9 |
| 7,957,895 B2 * | 6/2011 | Haase | ................ | 701/209 |
| 2003/0137453 A1 * | 7/2003 | Hannah et al. | ................ | 342/387 |
| 2008/0208449 A1 * | 8/2008 | Jung et al. | ................ | 701/201 |
| 2009/0012707 A1 * | 1/2009 | Krage et al. | ................ | 701/209 |
| 2009/0018769 A1 * | 1/2009 | Poliak | ................ | 701/209 |
| 2009/0024317 A1 * | 1/2009 | Aase et al. | ................ | 701/209 |
| 2010/0106406 A1 * | 4/2010 | Hille et al. | ................ | 701/206 |
| 2011/0063132 A1 * | 3/2011 | Trum | ................ | 340/932.2 |
| 2011/0118977 A1 * | 5/2011 | Hixson | ................ | 701/201 |
| 2011/0131154 A1 * | 6/2011 | Faber et al. | ................ | 705/418 |

FOREIGN PATENT DOCUMENTS

| | | |
|---|---|---|
| JP | 2001-291190 | 10/2001 |
| JP | 2006-031398 | 2/2006 |

OTHER PUBLICATIONS

Bettencourt, M. (Mar. 2, 2006). OnStar evolves to offer directions, but still keeps personal touch. The Globe and Mail Retrieved from http://search.proquest.com/docview/383578338?accountid=14753.*

* cited by examiner

*Primary Examiner* — Kathleen Palavecino
(74) *Attorney, Agent, or Firm* — Harness, Dickey & Pierce, P.L.C.

(57) ABSTRACT

A system is provided that may mark and communicate a location to a navigation system via a portable device. The portable device may include a user interface, a first GPS device, a first memory device and a transmitter. The user interface may selectively allow the first GPS device to acquire geographical coordinates of a current location of the portable device and store the geographical coordinates in the first memory device. The navigation system may include a second GPS device, a second memory device, a receiver, and a display. The transmitter of the portable device may communicate the geographical coordinates to the receiver of the navigation system.

37 Claims, 3 Drawing Sheets

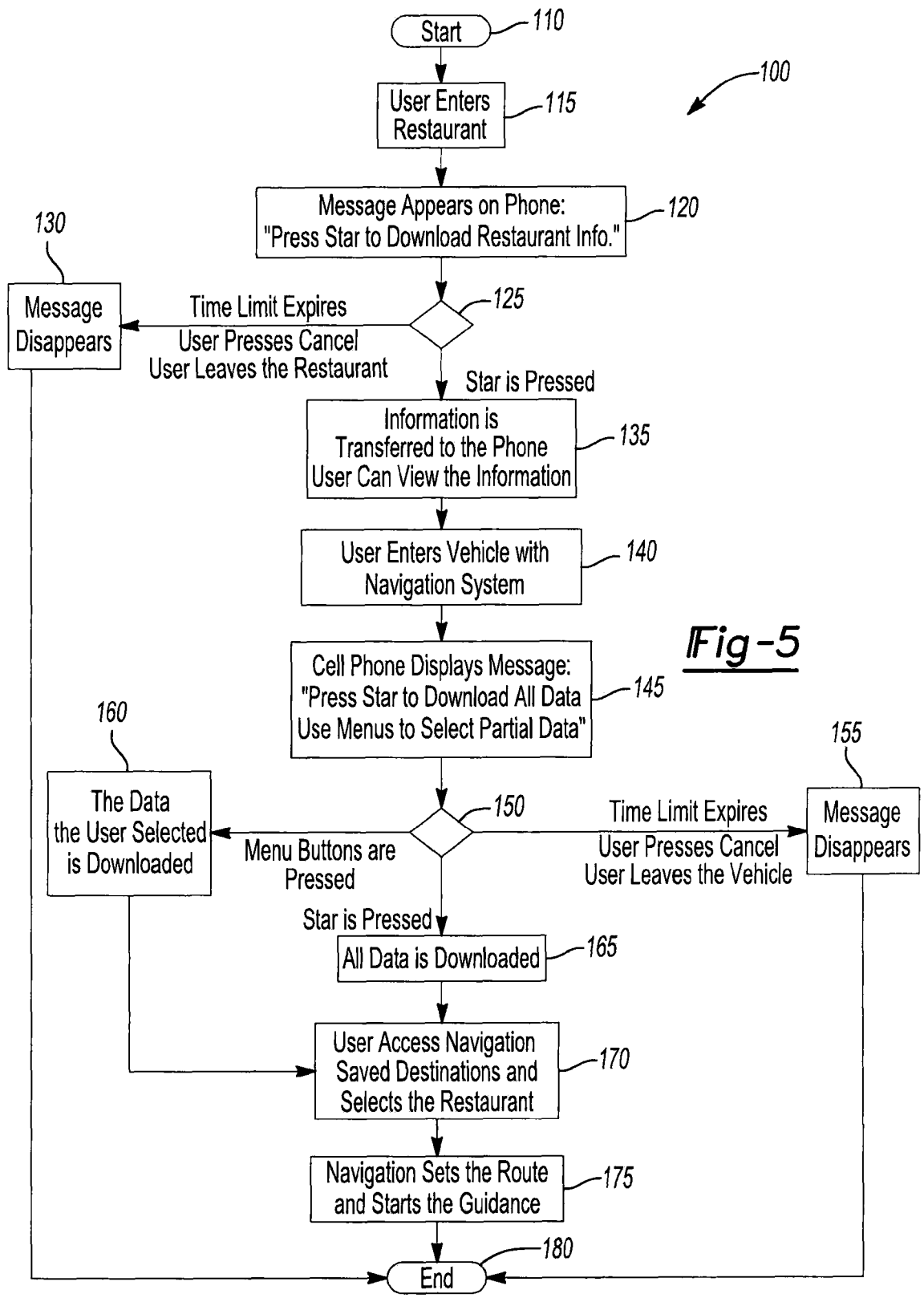

NAVIGATION LOCATION MARK BY CELL PHONE

FIELD

The present disclosure relates to a navigation system for a vehicle, and more particularly to a system and method for marking and communicating a location to a navigation system.

BACKGROUND

This section provides background information related to the present disclosure which is not necessarily prior art. Global positioning systems and navigation systems are commonly used to provide turn-by-turn driving directions. Navigation systems are often integrated into a vehicle such that they are not portable or easily removed. Even owners of portable navigation devices such as those manufactured by Garmin® or TomTom®, for example, are often left in the owners' vehicles and may not be routinely carried by the owner when the owner is not in his or her own vehicle.

A person may wish to save a location of interest in the navigation system kept in his or her vehicle, so that directions to that location will be readily available if he or she wants to return in the future. However, if the person is traveling by a means other than his or her own vehicle and is not carrying the navigation system from his or her vehicle, he or she will be unable to save the information regarding the location of interest in his or her vehicle navigation system.

SUMMARY

This section provides a general summary of the disclosure, and is not a comprehensive disclosure of its full scope or all of its features.

In one form, the present disclosure provides a system that may communicate a location to a navigation device via a portable device. The portable device may include a user interface, a first GPS device, a first memory device and a transmitter. The user interface may selectively allow the first GPS device to acquire geographical coordinates of a current location of the portable device and store the geographical coordinates in the first memory device. The navigation device may include a second GPS device, a second memory device, a receiver, and a display. The transmitter of the portable device may selectively communicate the geographical coordinates to the receiver of the navigation device.

In another form, the present disclosure provides a method which may include storing geographical information of a location of interest in a memory of a portable device, communicating the geographical information from the portable device to a navigation device, storing the geographical information in a memory device of the navigation system, accessing the geographical information on the navigation system, and displaying navigation information guiding a user to the location.

In yet another form, the present disclosure provides a method which may include entering a location of interest with a portable device, transmitting information associated with the location of interest to the portable device, storing the information in a memory unit disposed in the portable device, entering a vehicle having a navigation system, the navigation system including a receiver in communication with the portable device, transmitting the information from the portable device to the navigation system, storing the information in a memory device, recalling the information on the on the navigation device, determining a route to the location of interest based on the information; and displaying the route on a display screen of the navigation system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a flowchart depicting a scenario of operation of the system of FIG. 1 according to the principles of the present disclosure.

Corresponding reference numerals indicate corresponding parts throughout the several views of the drawings.

DETAILED DESCRIPTION

Figure 1:
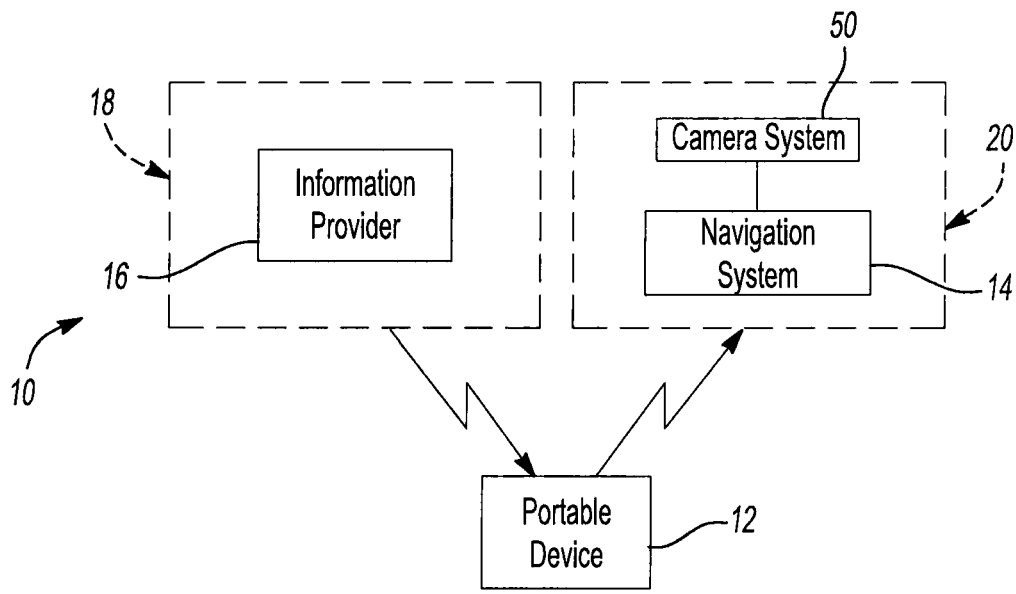
FIG. 1 is a block diagram of a system for marking and communicating a location to a navigation system according to the principles of the present disclosure.

Example embodiments will now be described more fully with reference to FIGS. 1-5. A system 10 is provided that may mark and communicate a geographic location such that a user may subsequently obtain driving directions to the geographical location. The system 10 may include a portable device 12, a navigation system 14, and optionally, an information provider 16 associated with a location of interest 18. The navigation system 14 may be disposed within a vehicle 20.

Figure 2:
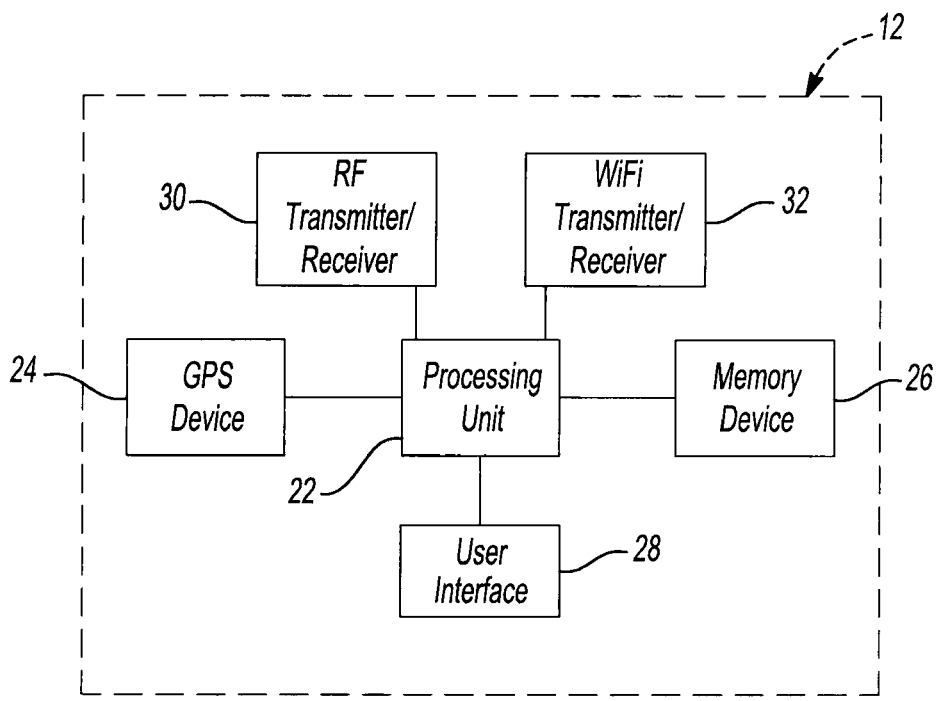
FIG. 2 is a block diagram of a portable device according to the principles of the present disclosure.

With particular reference to FIGS. 1 and 2, the portable device 12 may include a processing unit 22, a GPS (global positioning system) device 24, a memory device 26, a user interface 28, and an RF (radio frequency) transmitter/receiver 30. The portable device 12 may be a cellular phone such as an iPhone® or Blackberry®, for example, a laptop computer, a PDA (personal digital assistant) or any other portable electronic device. The portable device 12 may optionally include a transmitter/receiver 32 in communication with the processing unit 22 and adapted for wireless Internet connectivity, such as a Wi-Fi® or a 3G mobile network (or any other mobile network generation) transmitter/receiver, for example.

The GPS device 24, memory device 26, user interface 28, and RF transmitter/receiver 30 may be in communication with the processing unit 22. As used herein, the term "processing unit" may refer to, be part of, or include an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality. The GPS device 24 may be adapted to determine geographical coordinates (i.e., latitude and longitude) of the portable device 12 and track the location of the portable device 12 in real-time (or near real-time). The user interface 28 may include a display screen, speakers, buttons and/or a touch screen interface to enable the user to control the operation of the portable device 12 and interact with software installed thereon, as will be subsequently described. The RF transmitter/receiver 30 may be a Bluetooth® transmitter/receiver, for example, or any other suitable device adapted for local wireless communication. The RF transmitter/receiver 30 may transmit and receive RF signals.

While the portable device 12 is described above as including the GPS device 24 integrated therein, it should be appreciated that in some embodiments, the portable device may not include a GPS device. In some of these embodiments, the system 10 may receive geographical information from the information provider 16, as will be subsequently described. In other embodiments, the portable device 12 may obtain its current geographical location and coordinates by other means. For example, the portable device 12 may be adapted to remotely communicate with any external or remotely located GPS or navigation device via the RF transmitter/receiver 30, for example.

Figure 3:
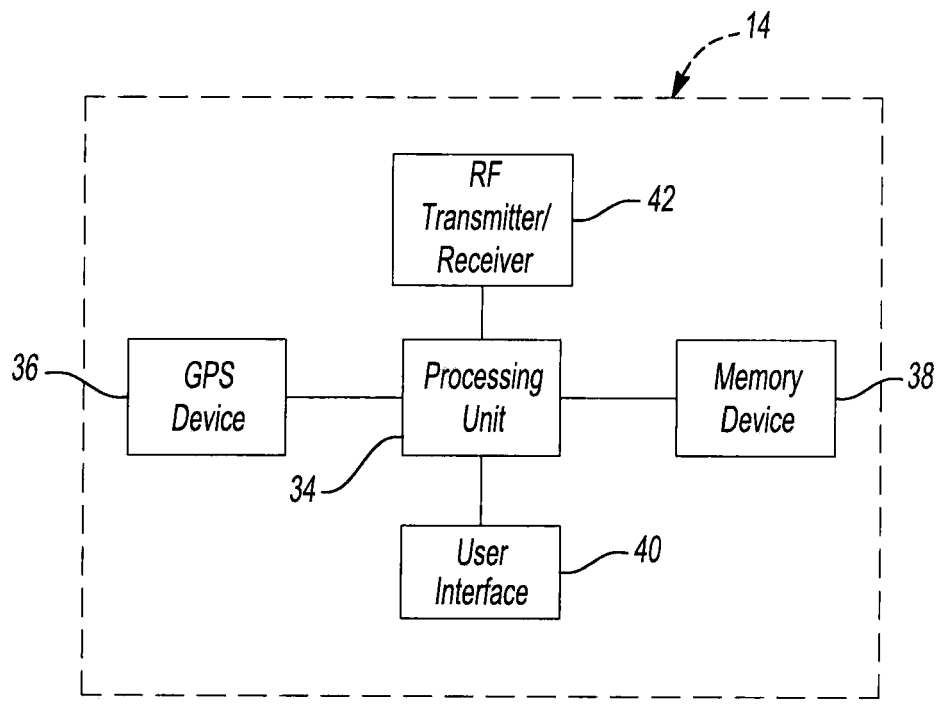
FIG. 3 is a block diagram of the navigation system of FIG. 1.

Referring now to FIG. 3, the navigation system 14 may include a processing unit 34, a GPS device 36, a memory device 38, a user interface 40, and an RF transmitter/receiver 42 such as a Bluetooth® transmitter/receiver. The navigation system 14 may be disposed in the vehicle 20 (FIG. 1) and may determine a route from the current location of the navigation system 14 to a selected location or destination. The navigation system 14 may provide turn-by-turn driving directions to the selected location which a driver of the vehicle 20 may follow. Such directions may be displayed on a display screen of the user interface 40. The navigation system 14 may be integrated or hardwired into the vehicle 20. Alternatively, the navigation system 14 may be portable such that the user may easily remove the navigation system 14 from the vehicle 20 and operate the navigation system 14 outside of and/or independently of the vehicle 20.

The GPS device 36, memory device 38, user interface 40 and transmitter/receiver 42 may be in communication with the processing unit 34. The user interface 40 may include a display screen, speakers, buttons and/or a touch screen interface to enable the user to control the operation of the navigation system 14 and interact with software installed thereon. The user interface 40 may be adapted to allow the user to store geographical coordinates of a current location of the navigation system 14 in the memory device 38. The user may subsequently access and view any stored geographical information via the user interface 40.

The RF transmitter/receiver 42 of the navigation system 14 may wirelessly communicate with the RF transmitter/receiver 30 of the portable device 12 whenever the portable device 12 is in close enough proximity to the navigation system 14 to facilitate such local RF communication (i.e., within about 2-10 meters or about 6-30 feet). It will be appreciated that a range extension device such as the AIRcable™ Industrial XR manufactured by Wireless Cables, Inc., for example, may be utilized to increase the range over which the RF transmitters/receivers 30, 42 may communicate with each other.

The vehicle 20 may include a camera system 50 (FIG. 1) including one or more cameras (such as a four-camera system) that may take photographs of the location of interest 18 and communicate the image data to the portable device 12 via the transmitter/receiver 42 of the navigation system 14 for the user's future reference. The portable device 12 may store such image data in the memory device 26. Additionally or alternatively, the image data may be stored in the memory device 38 of the navigation system 14.

Figure 4:
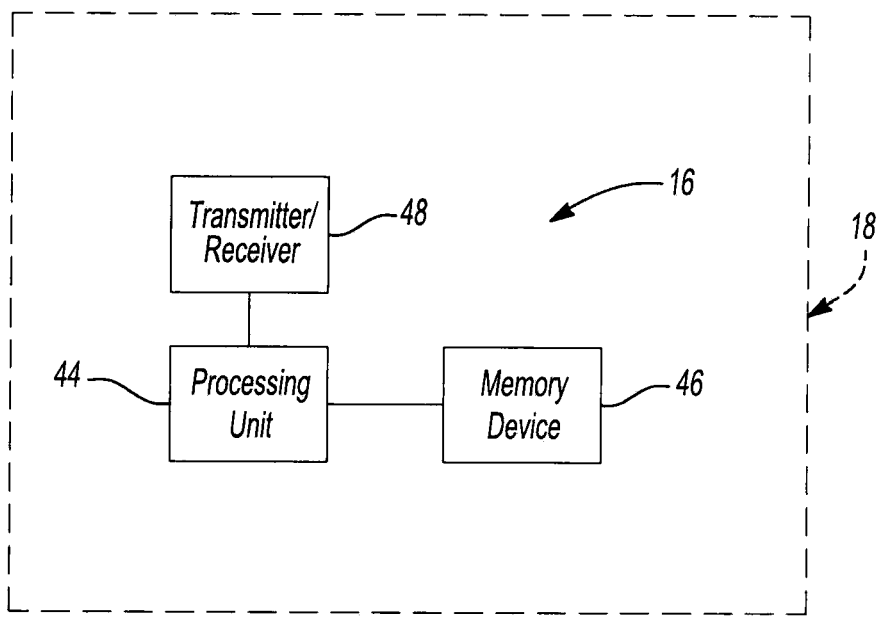
FIG. 4 is a block diagram of a location of interest according to the principles of the present disclosure.

With reference to FIG. 4, the information provider 16 may include a processing unit 44, a memory device 46 and a transmitter/receiver 48. The information provider 16 may be disposed at or inside of the location of interest 18. The location of interest 18 may be a restaurant, a store, a tourist attraction, or a home of a friend or acquaintance, for example, or any other place of business, any entertainment venue or any other location of interest to which the user may go and/or consider going in the future. The memory device 46 may store information about the location of interest 18 such as its geographical coordinates (i.e., latitude and longitude), business hours or hours of operation, menus, nutritional information, information about sales or promotional events, contact information and/or any other useful or interesting information about the location of interest 18.

The memory device 46 and transmitter/receiver 48 may be in communication with the processing unit 44. The transmitter/receiver 48 may be an RF transmitter/receiver such as a Bluetooth® transmitter/receiver and may transmit and receive RF signals. Additionally or alternatively, the transmitter/receiver 48 may be adapted for Wi-Fi®, 3G and/or wired Internet communication. The transmitter/receiver 48 may transmit the information about the location of interest 18 stored in the memory device 46. Optionally, the information provider 16 may include a USB (universal serial bus) input to enable the portable device 12 to connect with the processing unit 44 for communication therewith.

While the information provider 16 is described above as being located at or disposed in the location of interest 18, it should be appreciated that the information provider 16 could be located anywhere from which it may broadcast the information to the portable device 12. For example, the information provider 16 could be disposed at or near a billboard or sign advertising the location of interest 18. In such an embodiment, the portable device 12 may receive the information about the location of interest 18 as the user carrying the portable device 12 passes the sign or billboard. In this manner, the portable device 12 may obtain the geographical coordinates of the location of interest 18 while the portable device 12 is proximate to the sign, billboard or other location of the information provider 16 even though the information provider 16 may be physically located remotely from the location of interest 18. As will be subsequently described, the geographical coordinates of the location of interest 18 can be transmitted to the navigation system 14. The navigation system 14 may then determine driving directions to the location of interest 18 and guide user to the location of interest 18.

With reference to FIGS. 1-5, operation of the system 10 will be described in detail. As will be subsequently described, the RF transmitter/receiver 30 and/or the Wi-Fi® transmitter/receiver 32 of the portable device 12 may receive the information from the transmitter/receiver 48 of the information provider 16. The transmitter/receiver 30 of the portable device 12 may subsequently transmit this information to the navigation system 14, where it may be received by the transmitter/receiver 42 of the navigation system 14 and stored in the memory device 38.

Turning now to FIG. 5, a flowchart 100 depicts a scenario of operation of the system 10 beginning at start block 110. In the particular example illustrated, at block 115, the user may enter the location of interest 18, which, as described above, may be a restaurant. The transmitter/receiver 48 of the information provider 16 may be continuously or intermittently transmitting a signal including geographical and/or business information about the location of interest 18. This signal may be received by the RF transmitter/receiver 30 or Wi-Fi® transmitter/receiver 32 of the portable device 12 upon the user choosing to accept such information. It should be appreciated that user need not actually enter the location of interest 18.

The RF transmitter/receiver 30 or Wi-Fi® transmitter/receiver 32 may communicate with the transmitter/receiver 48 while the portable device 12 is in the parking lot, for example, or otherwise near the location of interest 18.

As shown at block 120, the portable device may display a message on the user interface 28 asking the user to press a button, such as the star (*) button, to download or receive the information from the information provider 16. At block 125, the processing unit 22 of the portable device 12 may determine whether the user has pressed the star button, pressed a cancel button, transported the portable device outside of the range of the transmitter/receiver 48, or if a predetermined time limit has expired. The predetermined time limit can be any duration of time between about 30 seconds to about one hour, for example, or any other duration of time. If the predetermined time limit expires, the user presses the cancel button or the user transports the portable device 12 out of the communication range of the information provider 16, the message displayed at block 120 may disappear at block 130 and the logic of flowchart 100 may end at block 180. However, if the user presses the star button while within range of the information provider 16 and before the predetermined time limit expires, geographical information, business information and/or other information of interest about the location of interest 18 may be received by the portable device 12, as shown at block 135, and stored in the memory device 26 of the portable device 12. The user may access and view such information via the user interface 28 of the portable device 12. The user may also choose to save the contact information of the location of interest 18 in an electronic phone book or contact list in the portable device 12.

In some embodiments, the portable device 12 may be configured such that the portable device 12 will ignore or fail to receive transmissions from the information provider 16 unless the user prompts the portable device 12 (via the user interface 28) to seek such transmissions. Software embedded in the processing unit 22 may be written or configured to provide such functionality.

In still other embodiments, the location of interest 18 may not be equipped with the information provider 16. In such embodiments, if the user wants to mark and store the geographical coordinates of the location of interest 18 (or coordinates of the user's current location), the user may prompt the GPS device 24 of the portable device 12 to determine the geographical coordinates and store them in the memory device 26. It will be appreciated that the user may prompt the portable device 12 to perform these steps by pressing a designated button or series of buttons on the user interface 28.

Upon receiving and storing the information in the portable device 12 at block 135, the user may leave the location of interest 18. The steps described above may be repeated for multiple locations of interest 18. In this manner, the portable device 12 may store geographical information, business information and/or other information of interest about one or more locations of interest 18.

At the user's convenience, the user may carry the portable device 12 into or proximate to the vehicle 20 having the navigation system 14, as shown at block 140, or otherwise within range in which the RF transmitter/receiver 30 of the portable device 12 may communicate with the RF transmitter/receiver 42 of the navigation system 14.

Once the RF transmitter/receivers 30, 42 are within communication range of each other, the portable device 12 may display a message on the user interface 28, as shown at block 145, to press a designated button (such as the star button, for example) to transfer, via an RF signal, all of the information about the one or more locations of interest 18 stored in the portable device 12 to the memory device 38 of the navigation system 14. The message may also indicate that the user may optionally transfer selected portions of the information to the navigation system 14. This may be accomplished by navigating option menus using menu buttons on the user interface 28 of the portable device 12.

At block 150, the portable device 12 may determine whether the user selected the option to transfer all data about the one or more locations of interest 18, whether the user selected portions of the information to transfer to the navigation system 14, whether the predetermined time limit has expired, or whether the user pressed the cancel button or transported the portable device 12 out of communication range of the RF transmitter/receivers 30, 42 of the portable device 12 and navigation system 14, respectively. If the predetermined time limit expires, the user presses the cancel button, or if the user transports the portable device 12 out of the communication range of the RF transmitter/receivers 30, 42, the message displayed at block 145 on the portable device 12 may disappear, as shown at block 155, and the process may end at block 180 without transferring any information to the navigation system 14. However, if the user presses menu buttons to transfer selected information to the navigation system 14, such selected information may be transmitted from the RF transmitter/receiver 30 to the RF transmitter/receiver 42, as shown at block 160. If the user presses the star button at block 150, all information about the one or more locations of interest 18 may be transmitted from the RF transmitter/receiver 30 to the RF transmitter/receiver 42, as shown at block 165. Upon receiving the selected information or all of the information from the portable device 12 at block 160 or 165, respectively, the information may be stored in the memory device 38 of the navigation system 14.

As shown at block 170, the user may subsequently recall or access the information about any of the one or more locations of interest 18 stored in the memory device 38 using the user interface 40 of the navigation system 14. The user interface 40 may display a list of locations for the user to select. Upon selecting a location of interest from the list of locations stored in the navigation system 14, the GPS device 36 may determine a current location of the navigation system 14 (or a current location of the vehicle 20 in which the navigation system 14 is disposed). A shown at block 175, the processing unit 34 of the navigation system 14 may then determine a driving route from the current location to the stored geographical coordinates of the location of interest 18. The navigation system 14 may provide turn-by-turn directions to guide the driver of the vehicle 20 to the location of interest 18. Additionally or alternatively, the user may display the information about the one or more locations of interest 18 on the user interface of the portable device 12. Such functionality may be particularly useful, for example, if the user wants to view the business hours, special events, the menu and/or other information about the location of interest 18 while traveling to or deciding whether to travel to the location of interest 18.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A system comprising:
   a portable device having a user interface, a first GPS device, a first memory device and a transmitter, the user interface selectively allowing the first GPS device to acquire geographical coordinates of a location of interest and store the geographical coordinates in the first memory device; and
   a navigation system including a second GPS device, a second memory device, a receiver, and a display, wherein
   the portable device and the navigation system communicate through radio frequency (RF) communication;
   the portable device displays a message on the user interface prompting a user to communicate the geographical coordinates of the location of interest immediately when the portable device is within range of the navigation system; and
   the transmitter of the portable device communicates the geographical coordinates of the location of interest to the receiver of the navigation system when prompted by the user in response to the message.

2. The system of claim 1, wherein the user interface of the portable device prompts the user to store the geographical information of the location of interest in the portable device.

3. The system of claim 1, further comprising a communication device associated with the location of interest and adapted to wirelessly communicate the geographical information to the portable device.

4. The system of claim 3, wherein the communication device is a personal computer.

5. The system of claim 3, wherein the communication device transmits business information associated with the location of interest to the portable device.

6. The system of claim 3, wherein the communication device includes a radio frequency transmitter/receiver in communication with the portable device.

7. The system of claim 1, wherein the portable device communicates with the navigation system via a radio frequency transmitting/receiving compatible device.

8. The system of claim 1, wherein the geographical information includes latitude and longitude coordinates.

9. The system of claim 1, wherein the portable device is a cellular phone.

10. The system of claim 1, wherein the navigation system is installed in a vehicle.

11. The system of claim 1, wherein the portable device prompts the user by displaying a message on the portable device.

12. The system of claim 11, wherein the message indicates that the user may optionally transfer selected portions of information related to the location of interest.

13. The system of claim 12, wherein the user can display the information related to the location of interest on the user interface of the portable device.

14. The system of claim 1, wherein the navigation system determines a driving route from a current location to the location of interest.

15. A method comprising:
   storing geographical information of a location of interest in a memory of a portable device;
   establishing a radio frequency (RF) communication between the portable device and the navigation system;
   displaying a message on the portable device prompting a user to communicate the geographical information of the location of interest immediately when the portable device is within range of the navigation system;
   communicating the geographical information of the location of interest from the portable device to the navigation system when prompted by the user in response to the message;
   storing the geographical information in a memory device of the navigation system;
   accessing the geographical information on the navigation system; and
   displaying navigation information guiding a user to the location.

16. The method of claim 15, further comprising prompting the user to store the geographical information of the location in the portable device.

17. The method of claim 15, further comprising providing a communication device associated with the location and communicating the geographical information from the communication device to the portable device.

18. The method of claim 17, further comprising communicating business information associated with the location from the communication device to the portable device.

19. The method of claim 18, wherein the business information includes data selected from the group consisting of contact information, hours of operation, and menu information.

20. The method of claim 15, wherein the portable device communicates with the navigation system via a radio frequency transmitter/receiver compatible device.

21. The method of claim 15, wherein the geographical information includes latitude and longitude coordinates.

22. The method of claim 15, wherein the portable device is a cellular phone.

23. The method of claim 15, wherein the navigation system is installed in a vehicle.

24. The method of claim 15, wherein the step of prompting includes displaying a message on the portable device.

25. The method of claim 24, wherein the message indicates that the user may optionally transfer selected portions of additional information related to the location of interest.

26. The method of claim 25, further comprising optionally displaying the additional information related to the location of interest on a user interface of the portable device.

27. The method of claim 15, further comprising determining a driving route from a current position to the location of interest.

28. A method comprising:
 entering a location of interest with a portable device;
 transmitting information associated with the location of interest to the portable device;
 storing the information in a first memory device disposed in the portable device;
 entering a vehicle having a navigation system, the navigation system including a receiver in communication with the portable device;
 establishing radio frequency (RF) communication between the portable device and the navigation system;
 displaying a message on the portable device prompting a user to transmit the information associated with the location of interest immediately when the portable device is within range of the navigation system;
 transmitting the information from the portable device to the navigation system when prompted by the user in response to the message;
 storing the information in a second memory device of the navigation system;
 recalling the information on the navigation system;
 determining a route to the location of interest based on the information; and
 displaying the route on a display screen of the navigation system.

29. The method of claim 28, further comprising providing a first radio frequency transmitter/receiver in the portable device and a second radio frequency transmitter/receiver in the navigation system.

30. The method of claim 28, wherein the step of prompting includes displaying a message on the portable device.

31. The method of claim 30, wherein the message indicates that the user may optionally transfer selected portions of the information associated with the location of interest.

32. The method of claim 31, further comprising optionally displaying the information associated with the location of interest on a user interface of the portable device.

33. A system comprising:
 an information provider associated with a location of interest, the information provider including a first memory device, a processing unit, and a first transmitter;
 a portable device having a user interface, a second memory device, a second transmitter and a first receiver receiving geographical coordinates of the location of interest and communicating the geographical coordinates to the second memory device; and
 a navigation system including a GPS device, a third memory device, a second receiver, and a display, wherein
 the portable device and the navigation system communicate through radio frequency (RF) communication;
 the portable device displays a message on the user interface prompting a user to communicate the geographical coordinates of the location of interest immediately when the portable device is within range of the navigation system; and
 the second transmitted of the portable device communicates the geographical coordinates to the second receiver of the navigation device when prompted by the user in response to the message.

34. The system of claim 33, wherein the portable device prompts the user by displaying a message on the portable device.

35. The system of claim 34, wherein the message indicates that the user may optionally transfer selected portions of information related to the location of interest.

36. The system of claim 35, wherein the user can display the information related to the location of interest on the user interface of the portable device.

37. The system of claim 33, wherein the navigation system determines a driving route from a current location to the location of interest.

* * * * *